(12) United States Patent
Kashyap Godawarthy et al.

(10) Patent No.: US 12,278,412 B2
(45) Date of Patent: Apr. 15, 2025

(54) INFINITE SHAPED COUPLER

(71) Applicant: HAND HELD PRODUCTS, INC., Charlotte, NC (US)

(72) Inventors: Kailash Kashyap Godawarthy, Bengaluru (IN); Pankaj Kumar Pandey, Bengaluru (IN)

(73) Assignee: HAND HELD PRODUCTS, INC., Charlotte, NC (US)

( * ) Notice: Subject to any disclaimer, the term of this patent is extended or adjusted under 35 U.S.C. 154(b) by 0 days.

(21) Appl. No.: 18/355,854

(22) Filed: Jul. 20, 2023

(65) Prior Publication Data

US 2025/0030143 A1    Jan. 23, 2025

(51) Int. Cl.
*H01P 5/02* (2006.01)
*G06K 19/07* (2006.01)

(52) U.S. Cl.
CPC ............ *H01P 5/02* (2013.01); *G06K 19/0723* (2013.01)

(58) Field of Classification Search
CPC .. H01P 3/00; H01P 1/2088; H01P 5/02; H01P 5/04; H01P 5/022; G06K 19/0723; G06K 19/07749; G06K 19/07718; G06K 19/077; G06K 7/10158
See application file for complete search history.

(56) References Cited

U.S. PATENT DOCUMENTS

2009/0002134 A1* 1/2009 McAllister ....... G06K 19/07749
340/10.51
2014/0354411 A1 12/2014 Pudenz

FOREIGN PATENT DOCUMENTS

| CN | 201359732 Y | 12/2009 | |
|---|---|---|---|
| JP | 2010079594 A | * 4/2010 | |
| KR | 10-2017-0140928 A | 12/2017 | |
| WO | WO-2017044322 A1 | * 3/2017 | ......... G01R 29/0878 |

OTHER PUBLICATIONS

Kuo, "Near-field power transfer and backscattering communication to miniature RFID tag in 65 nm CMOS technology" (Year: 2016).*
Tsai, "A Novel Amplifying Antenna Array Using Patch-Antenna Couplers-Design and Measurement" (Year: 2002).*

* cited by examiner

*Primary Examiner* — Thien T Mai
(74) *Attorney, Agent, or Firm* — ALSTON & BIRD LLP

(57) ABSTRACT

An example system is provided. In some embodiments, the system may include a coupler. In some embodiments, the coupler may include a first ground layer. In some embodiments, the coupler may include a conductive layer. In some embodiments, the conductive layer is substantially infinite shaped. In some embodiments, the coupler may include a first dielectric layer positioned between the first ground layer and the conductive layer. In some embodiments, the coupler may include a second ground layer having an aperture. In some embodiments, the coupler may include a second dielectric layer positioned between the conductive layer and the second ground layer. In some embodiments, the system may include a feed path configured to transport a plurality of radio frequency identification transponders through a defined region proximate the coupler. In some embodiments, the system may include a controller.

20 Claims, 18 Drawing Sheets

INFINITE SHAPED COUPLER

FIELD

Embodiments of the present disclosure relate generally to an infinite shaped coupler.

BACKGROUND

Applicant has identified many technical challenges and difficulties associated with couplers. Through applied effort, ingenuity, and innovation, Applicant has solved problems related to couplers by developing solutions embodied in the present disclosure, which are described in detail below.

BRIEF SUMMARY

Various embodiments described herein relate to infinite shaped couplers.

In accordance with one aspect of the disclosure, a coupler is provided. In some embodiments, the coupler may include a first ground layer. In some embodiments, the coupler may include a conductive layer. In some embodiments, the conductive layer is substantially infinite shaped. In some embodiments, the coupler may include a first dielectric layer positioned between the first ground layer and the conductive layer. In some embodiments, the coupler may include a second ground layer having an aperture. In some embodiments, the coupler may include a second dielectric layer positioned between the conductive layer and the second ground layer.

In some embodiments, the first ground layer is connected to the second ground layer.

In some embodiments, the conductive layer has a first side, a center point, and second side.

In some embodiments, second ground layer is positioned such that at least a portion of the aperture is above the center point of the conductive layer.

In some embodiments, the conductive layer is configured to be energized via the first side.

In some embodiments, the first ground layer, the conductive layer, and the first dielectric layer form a first printed circuit board.

In some embodiments, the second ground layer and the second dielectric layer form a second printed circuit board.

In accordance with another aspect of the disclosure, a system is provided. In some embodiments, the system may include a coupler. In some embodiments, the coupler may include a first ground layer. In some embodiments, the coupler may include a conductive layer. In some embodiments, the conductive layer is substantially infinite shaped. In some embodiments, the coupler may include a first dielectric layer positioned between the first ground layer and the conductive layer. In some embodiments, the coupler may include a second ground layer having an aperture. In some embodiments, the coupler may include a second dielectric layer positioned between the conductive layer and the second ground layer. In some embodiments, the system may include a feed path configured to transport a first radio frequency identification transponder of a plurality of radio frequency identification transponders through a defined region proximate the coupler. In some embodiments, the system may include a controller. In some embodiments, the controller is configured to energize the coupler to write data to the first radio frequency identification transponder of the plurality of radio frequency identification transponders when the first radio frequency identification transponder is in the defined region.

In some embodiments, the plurality of radio frequency identification transponders is associated with a pitch.

In some embodiments, the pitch is between 0.25 inches and 2.5 inches.

In some embodiments, the plurality of radio frequency identification transponders are active radio frequency identification transponders.

In some embodiments, the plurality of radio frequency identification transponders are passive radio frequency identification transponders.

In some embodiments, in response to the controller energizing the coupler to write data to the first radio frequency identification transponder, the feed path is configured to transport a second radio frequency identification transponder of the plurality of radio frequency identification transponders through the defined region.

In some embodiments, the controller is configured to energize the coupler to a first power level.

In some embodiments, a size of the defined region is based at least in part on the first power level.

In accordance with another aspect of the disclosure, a method of manufacturing a coupler is provided. In some embodiments, the method of manufacturing a coupler may include providing a first ground layer. In some embodiments, the method of manufacturing a coupler may include providing a conductive layer. In some embodiments, the conductive layer is substantially infinite shaped. In some embodiments, the method of manufacturing a coupler may include providing a first dielectric layer positioned between the first ground layer and the conductive layer. In some embodiments, the method of manufacturing a coupler may include providing a second ground layer having an aperture. In some embodiments, the method of manufacturing a coupler may include providing a second dielectric layer positioned between the conductive layer and the second ground layer.

In some embodiments, the first ground layer is connected to the second ground layer.

In some embodiments, the conductive layer has a first side, a center point, and second side.

In some embodiments, the second ground layer is positioned such that at least a portion of the aperture is above the center point of the conductive layer.

In some embodiments, the conductive layer is configured to be energized via the first side.

In some embodiments, the first ground layer, the conductive layer, and the first dielectric layer form a first printed circuit board.

In some embodiments, the second ground layer and the second dielectric layer form a second printed circuit board.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
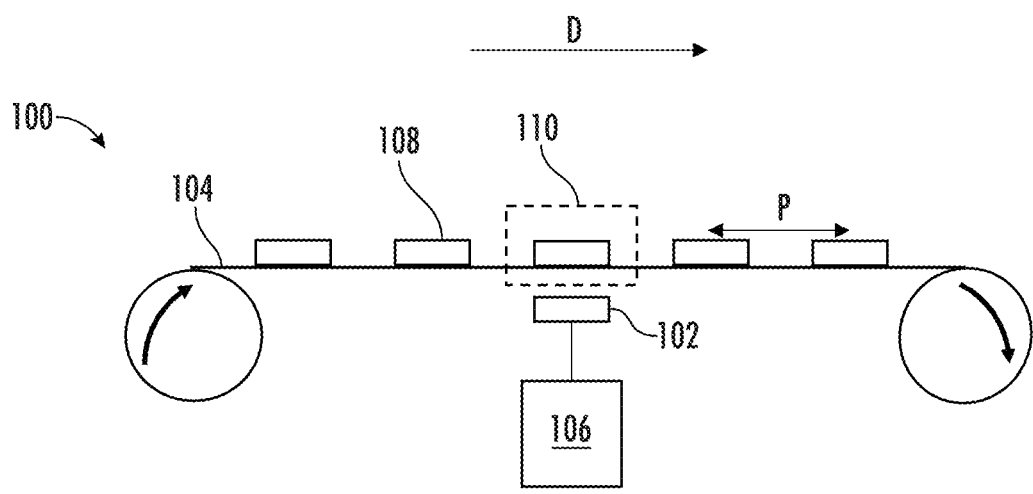
FIG. 1 illustrates an example system in accordance with one or more embodiments of the present disclosure.
Figure 2:
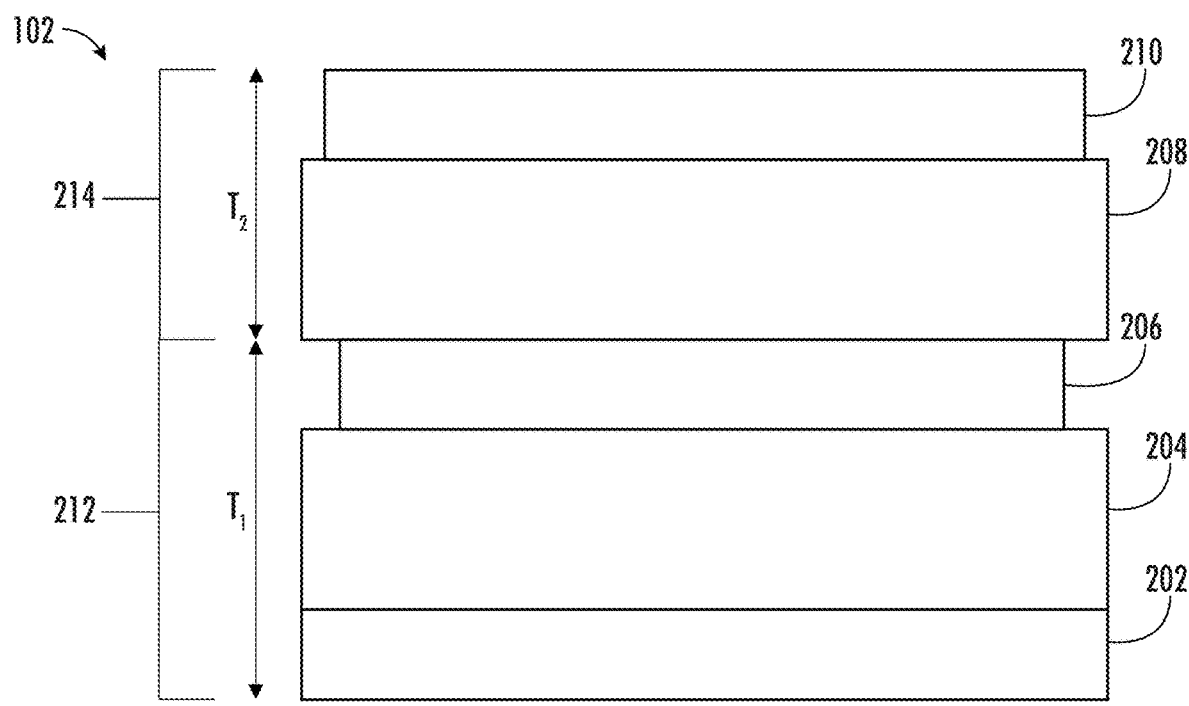
FIG. 2 illustrates an example side view of a coupler in accordance with one or more embodiments of the present disclosure.

Example embodiments will be described more fully hereinafter with reference to the accompanying drawings, in which some, but not all embodiments of disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Example embodiments disclosed herein address technical problems associated with couplers. As would be understood by one skilled in the field to which this disclosure pertains, there are numerous example scenarios in which a user may use a coupler. For example, a user may use a coupler to write data to a plurality of radio frequency identification transponders.

Example solutions for couplers for writing data to a plurality of radio frequency identification transponders include, for example, a system in which a feed path positions each of the plurality of radio frequency identification transponders proximate a coupler and energizes the coupler to write data to each of the plurality of radio frequency identification transponders when a radio frequency identification transponder is proximate the coupler. However, the data written to each of the plurality of radio frequency identification transponders may be different. As such, in such an example solution the coupler may inadvertently write data to some of the plurality of radio frequency identification transponders that the coupler did not intend to write data to. In order to avoid having the coupler inadvertently write data to unintended radio frequency identification transponders, the system may configure the feed path such that there is a large space between each of the plurality of radio frequency identification transponders (e.g., a pitch associated with the plurality of radio frequency identification transponders). However, such a configuration of the feed path results in the system being unable to write data to a large quantity of radio frequency identification transponders because time is lost as the feed path moves the next radio frequency transponder in the feed path to be proximate the coupler. Accordingly, there is a need for systems, couplers, and/or methods that can write data to a large quantity of radio frequency identification transponders in a timely manner without inadvertently writing data to a radio frequency identification transponder that the data was not intended for.

Thus, to address these and/or other issues related to couplers, example systems, couplers, and/or methods are disclosed herein. For example, an embodiment in this disclosure, described in greater detail below, includes a system. In some embodiments, the system may include a coupler. In some embodiments, the coupler may include a first ground layer. In some embodiments, the coupler may include a conductive layer. In some embodiments, the conductive layer is substantially infinite shaped. In some embodiments, the coupler may include a first dielectric layer positioned between the first ground layer and the conductive layer. In some embodiments, the coupler may include a second ground layer having an aperture. In some embodiments, the coupler may include a second dielectric layer positioned between the conductive layer and the second ground layer. In some embodiments, the system may include a feed path configured to transport a first radio frequency identification transponder of a plurality of radio frequency identification transponders through a defined region proximate the coupler. In some embodiments, the system may include a controller. In some embodiments, the controller is configured to energize the coupler to write data to the first radio frequency identification transponder of the plurality of radio frequency identification transponders when the first radio frequency identification transponder is in the defined region.

Example Systems and Apparatuses

With reference to FIGS. 1-16, a system 100 is illustrated. In some embodiments, the system 100 may include a coupler 102. In some embodiments, the coupler 102 may include a first ground layer 202. The first ground layer 202 may comprise one or more conductive materials. For example, the first ground layer 202 may comprise one or more of copper, iron, aluminum, and/or the like.

In some embodiments, the coupler 102 may include a conductive layer 206. The conductive layer 206 may comprise one or more conductive materials. For example, the conductive layer 206 may comprise one or more of copper, iron, aluminum, and/or the like. In some embodiments, the conductive layer 206 may have a length (L).

Figure 3:
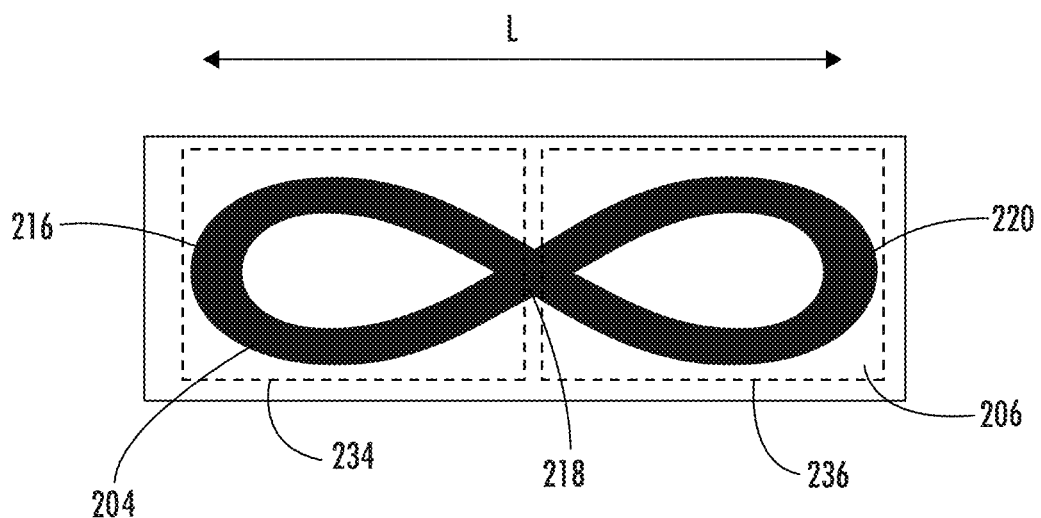
FIG. 3 illustrates an example top view of a coupler in accordance with one or more embodiments of the present disclosure.
Figure 4:
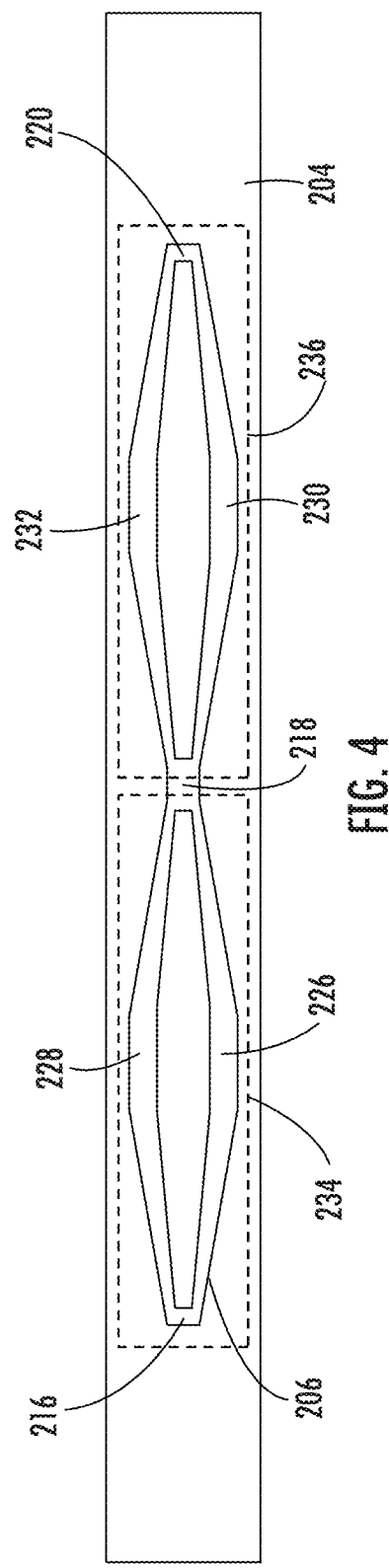
FIG. 4 illustrates another example top view of a coupler in accordance with one or more embodiments of the present disclosure.
Figure 5:
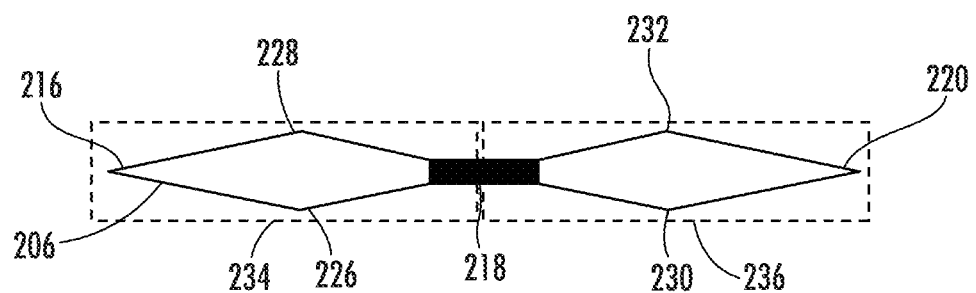
FIG. 5 illustrates another example top view of a coupler in accordance with one or more embodiments of the present disclosure.
Figure 6:
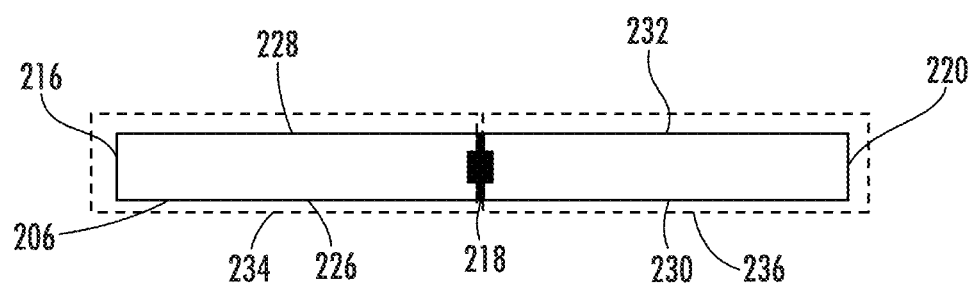
FIG. 6 illustrates another example top view of a coupler in accordance with one or more embodiments of the present disclosure.
Figure 7:
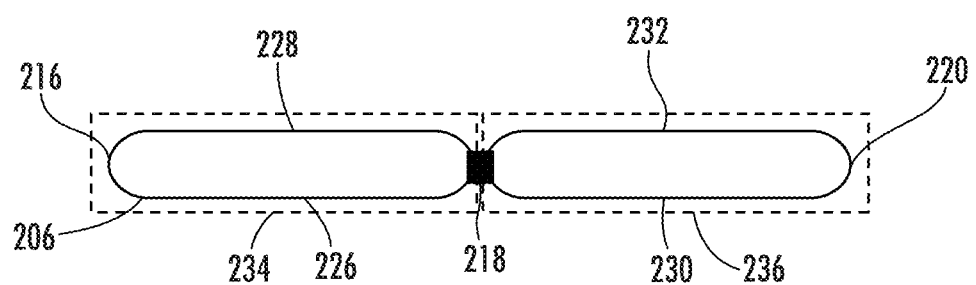
FIG. 7 illustrates another example top view of a coupler in accordance with one or more embodiments of the present disclosure.
Figure 8:
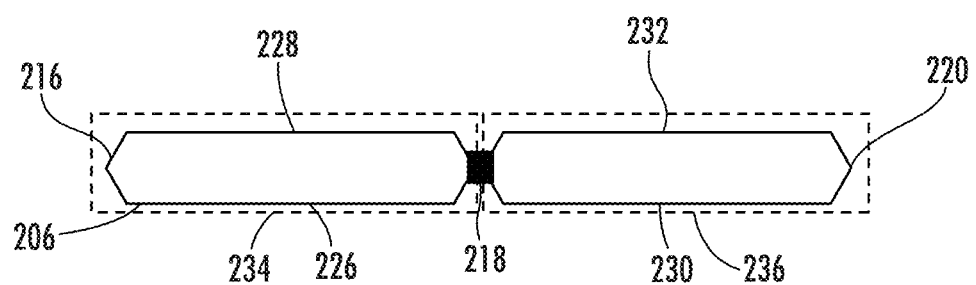
FIG. 8 illustrates another example top view of a coupler in accordance with one or more embodiments of the present disclosure.
Figure 9:
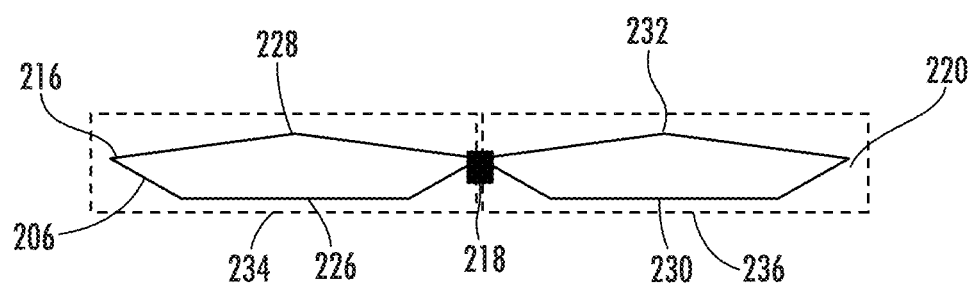
FIG. 9 illustrates another example top view of a coupler in accordance with one or more embodiments of the present disclosure.

In some embodiments, such as illustrated in FIGS. 3-9, the conductive layer 206 may be substantially infinite shaped. In this regard, for example, the conductive layer 206 may include a first trace 234 and a second trace 236 that together form the substantially infinite shape of the conductive layer 206. In some embodiments, the substantially infinite shape of the conductive layer 206 may be formed from more than two traces (e.g., the substantially infinite shape of the conductive layer 206 may be formed from three traces). In some embodiments, such as illustrated in FIG. 3, the first trace 234 and/or the second trace 236 may be substantially circular shaped. In some embodiments, such as illustrated in FIG. 5, the first trace 234 and/or the second trace 236 may be substantially diamond shaped. In some embodiments, such as illustrated in FIG. 6, the first trace 234 and/or the second trace 236 may be substantially rectangular in shape. In some embodiments, such as illustrated in FIG. 7, the first trace 234 and/or the second trace 236 may be substantially oval shaped. In some embodiments, such as illustrated in FIG. 8, the first trace 234 and/or the second trace 236 may be substantially hexagonal shaped. In some embodiments, such as illustrated in FIG. 9, the first trace 234 and/or the second trace 236 may be substantially parallelogram shaped.

In some embodiments, the conductive layer 206 may include a first side 216 (e.g., the first side 216 being part of the first trace 234), a center point 218 (e.g., the center point 218 being the point where the first trace 234 and the second trace 236 meet and/or combine), and a second side 220 (e.g., the second side 220 being part of the second trace 236). In some embodiments, the conductive layer 206 may be configured to be energized via the first side 216. In this regard, for example, the coupler 102 may be configured to receive a signal (e.g., a radio frequency signal) via the first side 216. In some embodiments, the conductive layer 206 may be configured to divide the received signal into a first divided signal that is associated with a first path 226 and a second divided signal that is associated with a second path 228 (e.g., the first path 226 and the second path 228 being part of the first trace 234). In some embodiments, the conductive layer 206 may be configured to combine the first divided signal and the second divided signal at the center point 218 into a first combined signal. In some embodiments the conductive layer 206 may be configured to divide the first combined signal into a third divided signal that is associated with a third path 230 and a fourth divided signal that is associated with a fourth path 232 (e.g., the third path 230 and the fourth path 232 being part of the second trace 236). In some embodiments, the conductive layer 206 is configured to combine the third divided signal and the fourth divided signal at the second side 220 into a second combined signal. In some embodiments, the coupler 102 may be configured to emit a signal based at least in part on the signal received via the first side 216 of the conductive layer 206.

In some embodiments, the coupler 102 may include a first dielectric layer 204. In some embodiments, the first dielectric layer 204 may comprise one or more dielectric materials. For example, the first dielectric layer 204 may comprise one or more of FR-4, CEM-1, CEM-2, CEM-3, Polytetrafluoroethylene (PTFE), Polyimide, and/or the like. The first dielectric layer 204 may be positioned between the first ground layer 202 and the conductive layer 206. In this regard, for example, the first ground layer 202, the conductive layer 206, and the first dielectric layer 204 may form a first printed circuit board (PCB) 212. The first PCB 212 may have a first thickness $T_1$.

Figure 10:
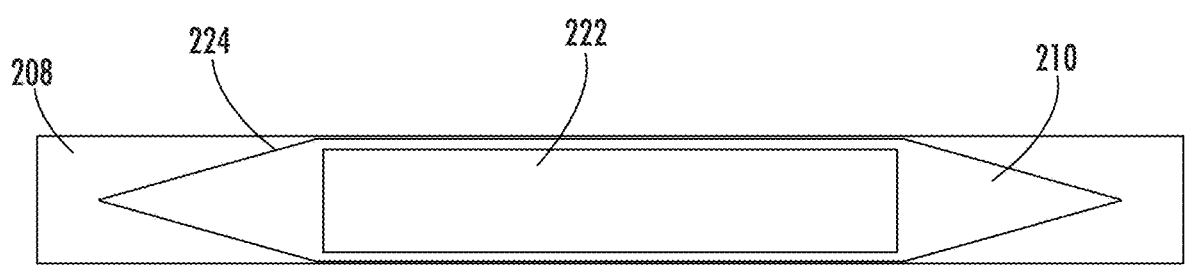
FIG. 10 illustrates another example top view of a coupler in accordance with one or more embodiments of the present disclosure.

In some embodiments, the coupler 102 may include a second ground layer 210. The second ground layer 210 may comprise one or more conductive materials. For example, the second ground layer 210 may comprise one or more of copper, iron, aluminum, and/or the like. In some embodiments, the second ground layer 210 may be connected to the first ground layer 202. For example, such as illustrated in FIG. 10, the second ground layer 210 may be connected to the first ground layer 202 via one or more vias 224 (e.g., circular copper vias).

Figure 11:
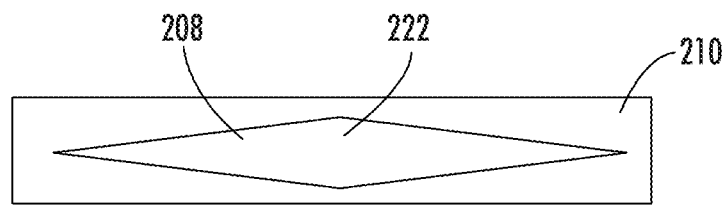
FIG. 11 illustrates another example top view of a coupler in accordance with one or more embodiments of the present disclosure.
Figure 12:
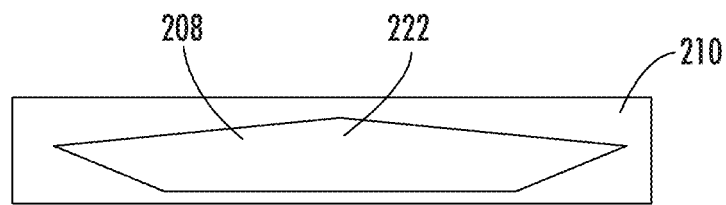
FIG. 12 illustrates another example top view of a coupler in accordance with one or more embodiments of the present disclosure.
Figure 13:
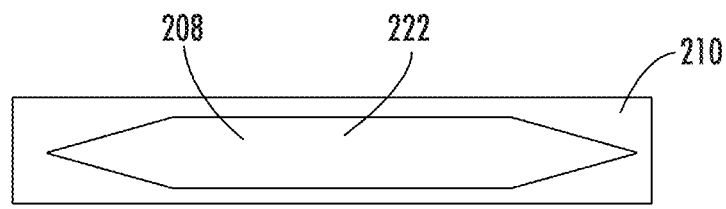
FIG. 13 illustrates another example top view of a coupler in accordance with one or more embodiments of the present disclosure.
Figure 14:
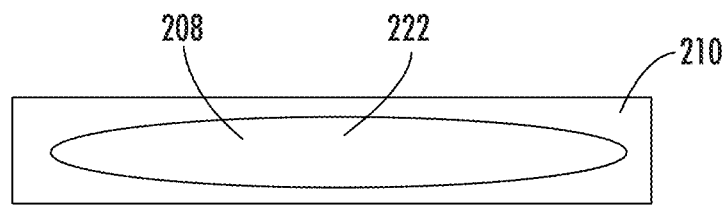
FIG. 14 illustrates another example top view of a coupler in accordance with one or more embodiments of the present disclosure.
Figure 15:
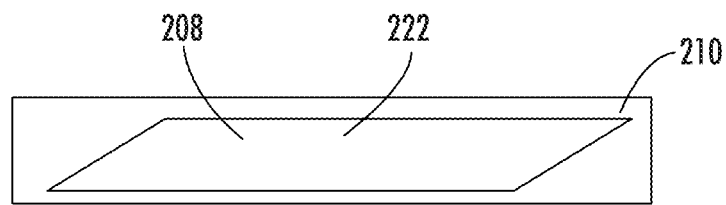
FIG. 15 illustrates another example top view of a coupler in accordance with one or more embodiments of the present disclosure.

In some embodiments, the second ground layer 210 may include an aperture 222. In some embodiments, such as illustrated in FIG. 10, the aperture 222 may be substantially rectangular in shape. In some embodiments, such as illustrated in FIG. 11, the aperture 222 may be substantially rhombus in shape. In some embodiments, such as illustrated in FIG. 12, the aperture 222 may be substantially irregular in shape. In some embodiments, such as illustrated in FIG. 13, the aperture 222 may be substantially hexagonal in shape. In some embodiments, such as illustrated in FIG. 14, the aperture 222 may be substantially circular in shape. In some embodiments, such as illustrated in FIG. 15, the aperture 222 may be substantially parallelogram in shape.

In some embodiments, the second ground layer 210 may be positioned such that at least a portion of the aperture 222 is above the center point 218 of the conductive layer 206. In this regard, for example, the aperture 222 may be configured to at least partially confine a signal emitted by the coupler 102. For example, the aperture 222 may be configured to at least partially confine a signal emitted by the coupler 102 that is based at least in part on the signal received by the first side 216 of the conductive layer 206.

In some embodiments, the coupler 102 may include a second dielectric layer 208. In some embodiments, the second dielectric layer 208 may comprise one or more dielectric materials. For example, the second dielectric layer 208 may comprise one or more of FR-4, CEM-1, CEM-2, CEM-3, Polytetrafluoroethylene (PTFE), Polyimide, and/or the like. The second dielectric layer 208 may be positioned between the conductive layer 206 and the second ground layer 210. In this regard, for example, the second dielectric layer 208 and the second ground layer 210 may form a second PCB 214. The second PCB 214 may have a second thickness $T_2$.

In some embodiments, the coupler 102 may be associated with an operating frequency. In some embodiments, the operating frequency may be based at least in part on the first thickness $T_1$ and/or second thickness $T_2$. Additionally or alternatively, the operating frequency may be based at least in part on the length (L) of the conductive layer 206.

Additionally or alternatively, the operating frequency may be based at least in part on the material of the first ground layer 202, the conductive layer 206, and/or the second ground layer 210 (e.g., copper, iron, aluminum, and/or the like). Additionally or alternatively, the operating frequency may be based at least in part on the material of the first dielectric layer 204 and/or the second dielectric layer 208 (e.g., FR-4, CEM-1, CEM-2, CEM-3, Polytetrafluoroethylene (PTFE), Polyimide, and/or the like).

In some embodiments, the system 100 may include a feed path 104. In some embodiments, the feed path 104 may be configured to transport a plurality of radio frequency identification transponders 108 through the system 100. In this regard, for example, the feed path 104 may be configured to transport the plurality of radio frequency identification transponders 108 through a defined region 110. For example, the feed path 104 may be configured to transport a first radio frequency identification transponder of the plurality of radio frequency identification transponders 108 through the defined region 110. The defined region 110 may be a region within the system 100. For example, the defined region 110 may be proximate the coupler 102. In some embodiments, the feed path 104 may be configured to transport the plurality of radio frequency identification transponders 108 through the system 100 in direction (D).

In some embodiments, the plurality of radio frequency identification transponders 108 may be associated with a pitch (P). The pitch (P) may be the distance between a point on one of the plurality of radio frequency identification transponders 108 to the same point on adjacent radio frequency identification transponder of the plurality of radio frequency identification transponders 108. For example, the pitch (P) may be the distance between the center point of a first radio frequency identification transponder to the center point of a second radio frequency identification transponder adjacent to the first radio frequency identification transponder. In some embodiments, the pitch (P) may be between approximately 0.25 inches and 2.5 inches. For example, the distance between the center point of a first radio frequency identification transponder to the center point of a second radio frequency identification transponder adjacent to the first radio frequency identification transponder may be 0.5 inches.

In some embodiments, one or more of the plurality of radio frequency identification transponders 108 may be an active radio frequency identification transponder. In this regard, for example, one or more of the plurality of radio frequency identification transponders 108 may include a power source, such as a battery. Additionally or alternatively, one or more of the plurality of radio frequency identification transponders 108 may be a passive radio frequency identification transponder. In this regard, for example, one or more of the plurality of radio frequency identification transponders 108 may not include a power source.

In some embodiments, the system 100 may include a controller 106. In some embodiments, the controller 106 may be configured to energize the coupler 102 to write data to the plurality of radio frequency identification transponders 108. For example, by energizing the coupler 102, the controller 106 may be configured to cause the coupler 102 to emit a signal configured to write data to the plurality of radio frequency identification transponders 108. In some embodiments, for example, the controller 106 may be configured to energize the coupler 102 to write data to a first radio frequency identification transponder of the plurality of radio frequency identification transponders 108. In this regard, the controller 106 may be configured to energize the coupler 102 to write data to the first radio frequency identification transponder when the first radio frequency identification transponder is in the defined region 110.

In some embodiments, in response to the controller 106 energizing the coupler 102 to write data to the first radio frequency identification transponder, the feed path 104 may be configured to transport a second radio frequency identification transponder of the plurality of radio frequency identification transponders 108 through the defined region 110. Said differently, in some embodiments, after the controller 106 has energized the coupler 102 to write data to the first radio frequency identification transponder, the controller 106 may be configured to cause the feed path 104 to transport the first radio frequency identification transponder out of the defined region 110 (e.g., in direction (D)) and transport the second radio frequency identification transponder through the defined region 110 (e.g., in direction (D)). In this regard, for example, when the second radio frequency identification transponder is in the defined region 110, the controller 106 may be configured to energize the coupler 102 to write data to the second radio frequency identification transponder of the plurality of radio frequency identification transponders 108.

In some embodiments, the data written to the first radio frequency identification transponder may be the same as the data written to the second radio frequency identification transponder. For example, the data written to the first radio frequency identification transponder may be data representing a product size (e.g., large) and the data written to the second identification transponder may be data representing a product size (e.g., large). In some embodiments, the data written to the first radio frequency identification transponder may be different than the data written to the second radio frequency identification transponder. For example, the data written to the first radio frequency identification transponder may be data representing a product size (e.g., large) and the data written to the second identification transponder may be data representing a product inventory number (e.g., product inventory number 84).

In some embodiments, the system 100 may be configured such that, each time the coupler 102 is energized, only one of the plurality of radio frequency identification transponders 108 has data written to it. Said differently, the system 100 may be configured such that, a first radio frequency identification transponder is transported through the defined region 110 by the feed path 104, the coupler 102 is energized when the first radio frequency identification transponder is in the defined region 110 to write data to the first radio frequency identification transponder, and the feed path 104 transports the first radio frequency identification transponder out of the defined region 110 and a second radio frequency identification transponder into the defined region 110.

In some embodiments, each time the coupler 102 is energized only one of the plurality of radio frequency identification transponders 108 has data written to it may be based at least in part on the controller 106 energizing the coupler 102 to a first power level. In this regard, for example, each of the plurality of radio frequency identification transponders 108 may be associated with a sensitivity. In some embodiments, the sensitivity of a radio frequency identification transponder may indicate an amount of power the radio frequency identification transponder must receive for data to be written to the radio frequency identification transponder (e.g., via a signal emitted by the coupler 102). For example, a radio frequency identification transponder may have a sensitivity of −18 dBm. In this regard, for example, a radio frequency identification transponder having a sensitivity of −18 dBm may need to receive an amount of power of approximately −18 dBm or greater. In this regard, for example, the coupler 102 may be energized to a first power level such that a radio frequency identification transponder inside the defined region 110 may receive an amount of power approximately equal to or greater than the sensitivity of the radio frequency identification transponder and radio frequency identification transponders outside the defined region 110 receive an amount of power approximately less than the sensitivity of the radio frequency identification transponders outside the defined region 110. In this regard, for example, a size of the defined region 110 may be based at least in part on the first power level that the coupler 102 is energized to. For example, the first power level may impact the area (e.g., the area of the defined region 110) in which a radio frequency identification transponder receives an amount of power equal to or greater than the sensitivity of the radio frequency identification transponder.

Figure 16:
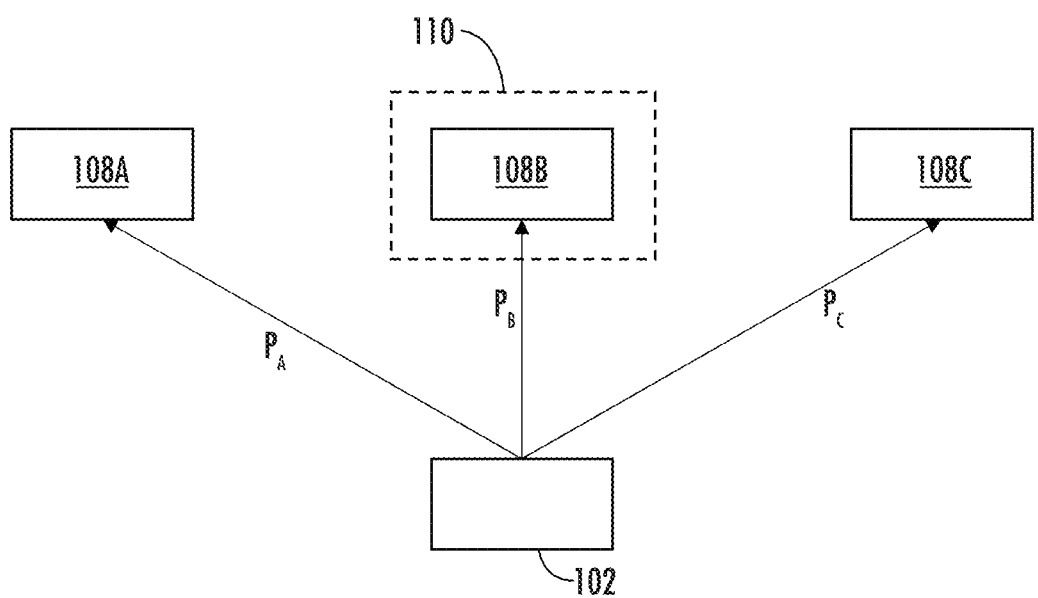
FIG. 16 illustrates another example view of a coupler in accordance with one or more embodiments of the present disclosure.

In some embodiments, such as illustrated in FIG. 16, the controller 106 may be configured to determine an amount of power that a radio frequency identification device in the defined region 110 is exposed to (e.g., radio frequency identification transponder 108B) when the coupler 102 is energized and/or an amount of power that radio frequency identification transponders that are outside the defined region 110 are exposed to when the coupler 102 is energized (e.g., radio frequency identification transponder 108A and radio frequency identification transponder 108C). For example, this may be determined using equation (1):

> Power Level Received at a Radio Frequency Identification Transponder=Power Level Coupler is Energized To+Coupler Gain+Transponder Gain−Fade Margin−Cable Loss−Path Loss In some embodiments, an amount of power received by a radio frequency identification transponder outside the defined region 110 may be less than an amount of power received by a radio frequency identification transponder inside the defined region 110 based at least in part on a path loss.

In some embodiments, the system 100 may be configured such that, each time the coupler 102 is energized, only one of the plurality of radio frequency identification transponders 108 has data written to it based at least in part on the aperture 222 in the second ground layer 210. In this regard, for example, as described above, the second ground layer 210 may be positioned such that at least a portion of the aperture 222 is above the center point 218 of the conductive layer 206. In this regard, for example, the aperture 222 confines the signal emitted from the coupler 102 such that the amount of power received by a radio frequency identification transponder in the defined region 110 is greater than the amount of power received by a radio frequency identification transponder outside of the defined region 110. For example, the aperture 222 at least in part increases the path loss for radio frequency identification transponders outside of the defined region 110.

Additionally or alternatively, the system 100 may be configured such that, each time the coupler 102 is energized, only one of the plurality of radio frequency identification transponders 108 has data written to it based at least in part on the conductive layer 206 being substantially infinite shaped. For example, the substantially infinite shape of the conductive layer 206 ensures that a greater portion of the signal emitted by the coupler 102 is directed towards a radio frequency identification transponder in the defined region 110 than a radio frequency identification transponder outside of the defined region 110.

Example Methods

Figure 17:
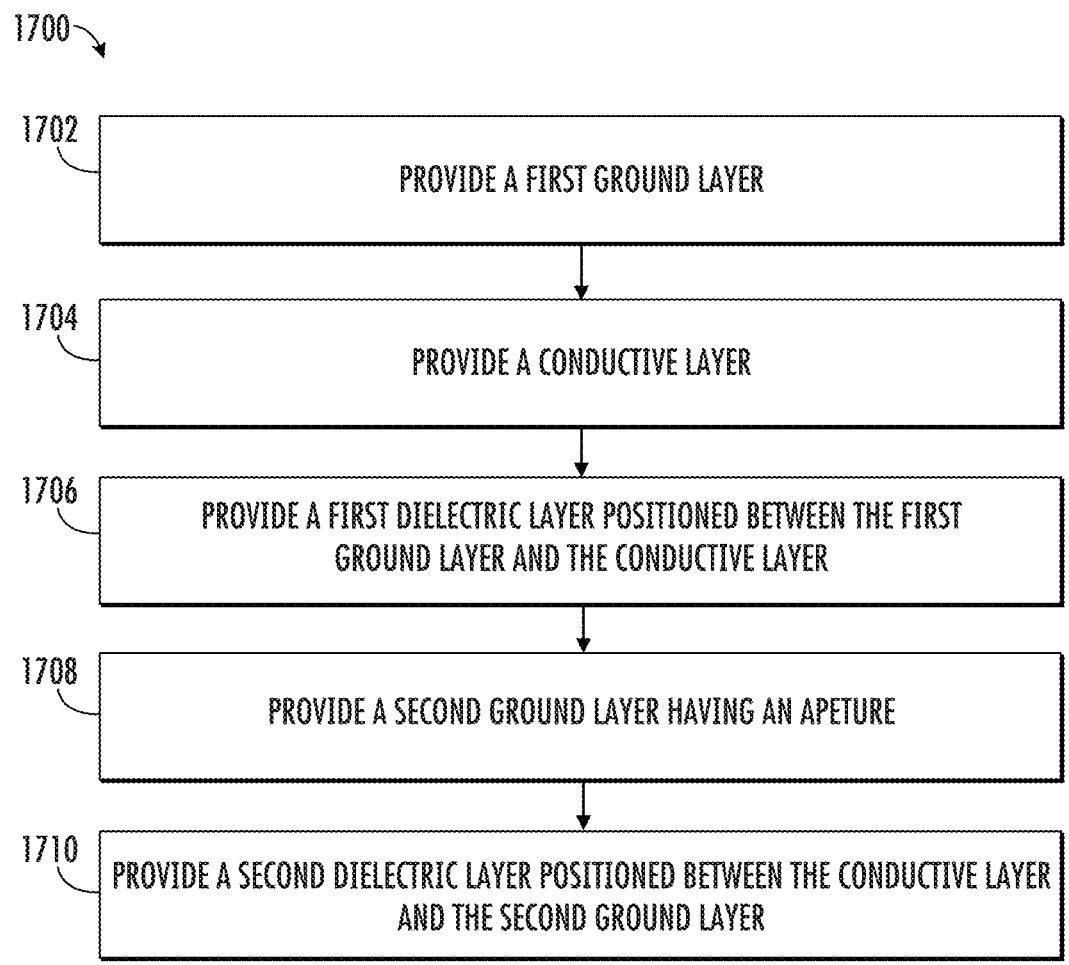
FIG. 17 illustrates a flowchart of an example method of manufacturing in accordance with one or more embodiments of the present disclosure.

Referring now to FIG. 17, a flowchart providing an example method of manufacturing a coupler 1700 is illustrated.

As shown in block 1702, the method of manufacturing a coupler 1700 may include providing a first ground layer. As described above, in some embodiments, the first ground layer may comprise one or more conductive materials. For example, the first ground layer may comprise one or more of copper, iron, aluminum, and/or the like.

As shown in block 1704, the method of manufacturing a coupler 1700 may include providing a conductive layer. As described above, in some embodiments, the coupler may include a conductive layer. The conductive layer may comprise one or more conductive materials. For example, the conductive layer may comprise one or more of copper, iron, aluminum, and/or the like. In some embodiments, the conductive layer may have a length (L).

In some embodiments, the conductive layer may be substantially infinite shaped. In this regard, for example, the conductive layer may include a first trace and a second trace that together form the substantially infinite shape of the conductive layer. In some embodiments, the substantially infinite shape of the conductive layer may be formed from more than two traces (e.g., the substantially infinite shape of the conductive layer may be formed from three traces). In some embodiments, the first trace and/or the second trace may be substantially circular shaped. In some embodiments, the first trace and/or the second trace may be substantially diamond shaped. In some embodiments, the first trace and/or the second trace may be substantially rectangular in shape. In some embodiments, the first trace and/or the second trace may be substantially oval shaped. In some embodiments, the first trace and/or the second trace may be substantially hexagonal shaped. In some embodiments, the first trace and/or the second trace may be substantially parallelogram shaped.

In some embodiments, the conductive layer may include a first side (e.g., the first side being part of the first trace), a center point (e.g., the center point being the point where the first trace and the second trace meet and/or combine), and a second side (e.g., the second side being part of the second trace). In some embodiments, the conductive layer may be configured to be energized via the first side. In this regard, for example, the coupler may be configured to receive a signal (e.g., a radio frequency signal) via the first side. In some embodiments, the conductive layer may be configured to divide the received signal into a first divided signal that is associated with a first path and a second divided signal that is associated with a second path (e.g., the first path and the second path being part of the first trace). In some embodiments, the conductive layer may be configured to combine the first divided signal and the second divided signal at the center point into a first combined signal. In some embodiments the conductive layer may be configured to divide the first combined signal into a third divided signal that is associated with a third path and a fourth divided signal that is associated with a fourth path (e.g., the third path and the fourth path being part of the second trace). In some embodiments, the conductive layer is configured to combine the third divided signal and the fourth divided signal at the second side into a second combined signal. In some embodiments, the coupler may be configured to emit a signal based at least in part on the signal received via the first side of the conductive layer.

As shown in block 1706, the method of manufacturing a coupler 1700 may include providing a first dielectric layer positioned between the first ground layer and the conductive layer. As described above, in some embodiments, the coupler may include a first dielectric layer. In some embodiments, the first dielectric layer may comprise one or more dielectric materials. For example, the first dielectric layer may comprise one or more of FR-4, CEM-1, CEM-2, CEM-3, Polytetrafluoroethylene (PTFE), Polyimide, and/or the like. The first dielectric layer may be positioned between the first ground layer and the conductive layer. In this regard, for example, the first ground layer, the conductive layer, and the first dielectric layer may form a first printed circuit board (PCB). The first PCB may have a first thickness $T_1$.

As shown in block 1708, the method of manufacturing a coupler 1700 may include providing a second ground layer having an aperture. As described above, in some embodiments, the coupler may include a second ground layer. The second ground layer may comprise one or more conductive materials. For example, the second ground layer may comprise one or more of copper, iron, aluminum, and/or the like. In some embodiments, the second ground layer may be connected to the first ground layer. For example, the second ground layer may be connected to the first ground layer via one or more vias (e.g., circular copper vias). In some embodiments, the second ground layer may include an aperture. In some embodiments, for example, the aperture may be substantially rectangular in shape. In some embodiments, the aperture may be substantially rhombus in shape. In some embodiments, the aperture may be substantially irregular in shape. In some embodiments, the aperture may be substantially hexagonal in shape. In some embodiments, the aperture may be substantially circular in shape. In some embodiments, the aperture may be substantially parallelogram in shape.

In some embodiments, the second ground layer may be positioned such that at least a portion of the aperture is above the center point of the conductive layer. In this regard, for example, the aperture may be configured to at least partially confine a signal emitted by the coupler. For example, the aperture may be configured to at least partially confine a signal emitted by the coupler that is based at least in part on the signal received by the first side of the conductive layer.

As shown in block 1710, the method of manufacturing a coupler 1700 may include providing a second dielectric layer positioned between the conductive layer and the second ground layer. As described above, in some embodiments, the coupler may include a second dielectric layer. In some embodiments, the second dielectric layer may comprise one or more dielectric materials. For example, the second dielectric layer may comprise one or more of FR-4, CEM-1, CEM-2, CEM-3, Polytetrafluoroethylene (PTFE), Polyimide, and/or the like. The second dielectric layer may be positioned between the conductive layer and the second ground layer. In this regard, for example, the second dielectric layer and the second ground layer may form a second PCB. The second PCB may have a second thickness $T_2$.

In some embodiments, the coupler may be associated with an operating frequency. In some embodiments, the operating frequency may be based at least in part on the first thickness $T_1$ and/or second thickness $T_2$. Additionally or alternatively, the operating frequency may be based at least in part on the length (L) of the conductive layer. Additionally or alternatively, the operating frequency may be based at least in part on the material of the first ground layer, the conductive layer, and/or the second ground layer (e.g., copper, iron, aluminum, and/or the like). Additionally or alternatively, the operating frequency may be based at least in part on the material of the first dielectric layer and/or the second dielectric layer (e.g., FR-4, CEM-1, CEM-2, CEM-3, Polytetrafluoroethylene (PTFE), Polyimide, and/or the like).

Example Computer Processing Device

Figure 18:
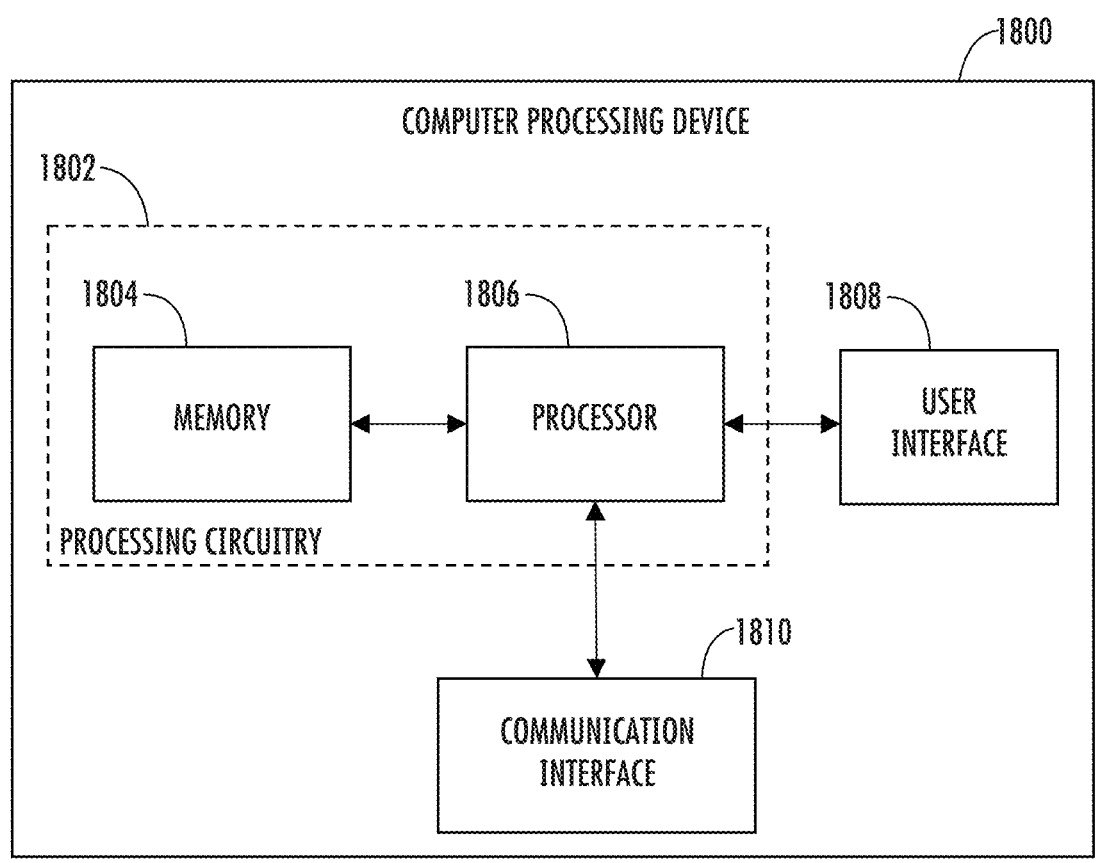
FIG. 18 illustrates a block diagram of an example computer processing device in accordance with one or more embodiments of the present disclosure.

With reference to FIG. 18, a block diagram of an example computer processing device 1800 is illustrated in accordance with some example embodiments. In some embodiments, the controller 106 may be embodied as one or more computer processing devices, such as the computer processing device 1800 in FIG. 18. However, it should be noted that the components, devices, or elements illustrated in and described with respect to FIG. 18 below may not be mandatory and thus one or more may be omitted in certain embodiments. Additionally, some embodiments may include further or different components, devices or elements beyond those illustrated in and described with respect to FIG. 18.

The computer processing device 1800 may include or otherwise be in communication with processing circuitry 1802 that is configurable to perform actions in accordance with one or more embodiments disclosed herein. In this regard, the processing circuitry 1802 may be configured to perform and/or control performance of one or more functionalities of the computer processing device 1800 in accordance with various embodiments, and thus may provide means for performing functionalities of the computer processing device 1800 in accordance with various embodiments. The processing circuitry 1802 may be configured to perform data processing, application execution and/or other processing and management services according to one or more embodiments. In some embodiments, the computer processing device 1800 or a portion(s) or component(s) thereof, such as the processing circuitry 1802, may be embodied as or comprise a chip or chip set. In other words, the computer processing device 1800 or the processing circuitry 1802 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The computer processing device 1800 or the processing circuitry 1802 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 1802 may include a processor 1806 and, in some embodiments, such as that illustrated in FIG. 18, may further include memory 1804. The processing circuitry 1802 may be in communication with or otherwise control a user interface 1808 and/or a communication interface 1810. As such, the processing circuitry 1802 may be embodied as a circuit chip (e.g., an integrated circuit chip) configured (e.g., with hardware, software or a combination of hardware and software) to perform operations described herein.

The processor 1806 may be embodied in a number of different ways. For example, the processor 1806 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 1806 may comprise a plurality of processors. The plurality of processors may be in operative communication with each other and may be collectively configured to perform one or more functionalities of the computer processing device 1800 as described herein. In some embodiments, the processor 1806 may be configured to execute instructions stored in the memory 1804 or otherwise accessible to the processor 1806. As such, whether configured by hardware or by a combination of hardware and software, the processor 1806 may represent an entity (e.g., physically embodied in circuitry-in the form of processing circuitry 1802) capable of performing operations according to embodiments of the present disclosure while configured accordingly. Thus, for example, when the processor 1806 is embodied as an ASIC, FPGA or the like, the processor 1806 may be specifically configured hardware for conducting the operations described herein. Alternatively, as another example, when the processor 1806 is embodied as an executor of software instructions, the instructions may specifically configure the processor 1806 to perform one or more operations described herein.

In some embodiments, the memory 1804 may include one or more non-transitory memory devices such as, for example, volatile and/or non-volatile memory that may be either fixed or removable. In this regard, the memory 1804 may comprise a non-transitory computer-readable storage medium. It will be appreciated that while the memory 1804 is illustrated as a single memory, the memory 1804 may comprise a plurality of memories. The memory 1804 may be configured to store information, data, applications, instructions and/or the like for enabling the computer processing device 1800 to carry out various functions in accordance with one or more embodiments. For example, the memory 1804 may be configured to buffer input data for processing by the processor 1806. Additionally or alternatively, the memory 1804 may be configured to store instructions for execution by the processor 1806. As yet another alternative, the memory 1804 may include one or more databases that may store a variety of files, contents or data sets. Among the contents of the memory 1804, applications may be stored for execution by the processor 1806 in order to carry out the functionality associated with each respective application. In some cases, the memory 1804 may be in communication with one or more of the processor 1806, user interface 1808, and/or communication interface 1810 via a bus(es) for passing information among components of the computer processing device 1800.

The user interface 1808 may be in communication with the processing circuitry 1802 to receive an indication of a user input at the user interface 1808 and/or to provide an audible, visual, mechanical or other output to the user. As such, the user interface 1808 may include, for example, a keyboard, a mouse, a joystick, a display, a touch screen display, a microphone, a speaker, and/or other input/output mechanisms. As such, the user interface 1808 may, in some embodiments, provide means for a user to access and interact with the controller 106.

The communication interface 1810 may include one or more interface mechanisms for enabling communication with other devices and/or networks. In some cases, the communication interface 1810 may be any means such as a device or circuitry embodied in either hardware, or a combination of hardware and software that is configured to receive and/or transmit data from/to a network and/or any other device or module in communication with the processing circuitry 1802. By way of example, the communication interface 1810 may be configured to enable the controller 106 to communicate with the coupler 102, the feed path 104, and/or other computing devices. Accordingly, the communication interface 1810 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

That which is claimed:
1. A coupler comprising:
   a first ground layer;
   a conductive layer, wherein the conductive layer is substantially in the shape of an infinity symbol;

a first dielectric layer positioned between the first ground layer and the conductive layer;

a second ground layer having an aperture; and a second dielectric layer positioned between the conductive layer and the second ground layer.

2. The coupler of claim 1, wherein the first ground layer is connected to the second ground layer.

3. The coupler of claim 1, wherein the conductive layer has a first side, a center point, and second side.

4. The coupler of claim 3, wherein the second ground layer is positioned such that at least a portion of the aperture is above the center point of the conductive layer.

5. The coupler of claim 3, wherein the conductive layer is configured to be energized via the first side.

6. The coupler of claim 1, wherein the first ground layer, the conductive layer, and the first dielectric layer form a first printed circuit board.

7. The coupler of claim 1, wherein the second ground layer and the second dielectric layer form a second printed circuit board.

8. A system comprising:
a coupler, wherein the coupler comprises:
a first ground layer;
a conductive layer, wherein the conductive layer is substantially in the shape of an infinity symbol;
a first dielectric layer positioned between the first ground layer and the conductive layer;
a second ground layer having an aperture; and
a second dielectric layer positioned between the conductive layer and the second ground layer;
a feed path configured to transport a first radio frequency identification transponder of a plurality of radio frequency identification transponders through a defined region proximate the coupler; and
a controller, wherein the controller is configured to energize the coupler to write data to the first radio frequency identification transponder of the plurality of radio frequency identification transponders when the first radio frequency identification transponder is in the defined region.

9. The system of claim 8, wherein the plurality of radio frequency identification transponders is associated with a pitch.

10. The system of claim 9, wherein the pitch is between 0.25 inches and 2.5 inches.

11. The system of claim 8, wherein the plurality of radio frequency identification transponders are active radio frequency identification transponders.

12. The system of claim 8, wherein the plurality of radio frequency identification transponders are passive radio frequency identification transponders.

13. The system of claim 8, wherein, in response to the controller energizing the coupler to write data to the first radio frequency identification transponder, the feed path is configured to transport a second radio frequency identification transponder of the plurality of radio frequency identification transponders through the defined region.

14. The system of claim 8, wherein the controller is configured to energize the coupler to a first power level.

15. The system of claim 14, wherein a size of the defined region is based at least in part on the first power level.

16. A method of manufacturing a coupler comprising:
providing a first ground layer;
providing a conductive layer, wherein the conductive layer is substantially in the shape of an infinity symbol;
providing a first dielectric layer positioned between the first ground layer and the conductive layer;
providing a second ground layer having an aperture; and
providing a second dielectric layer positioned between the conductive layer and the second ground layer.

17. The method of manufacturing a coupler of claim 16, wherein the first ground layer is connected to the second ground layer.

18. The method of manufacturing a coupler of claim 16, wherein the conductive layer has a first side, a center point, and second side.

19. The method of manufacturing a coupler of claim 18, wherein the second ground layer is positioned such that at least a portion of the aperture is above the center point of the conductive layer.

20. The method of manufacturing a coupler of claim 16, wherein the first ground layer, the conductive layer, and the first dielectric layer form a first printed circuit board and the second ground layer and the second dielectric layer form a second printed circuit board.

* * * * *